(12) United States Patent  
Sorensen

(10) Patent No.: US 9,042,574 B2  
(45) Date of Patent: May 26, 2015

(54) PROCESSING AUDIO SIGNALS

(75) Inventor: Karsten Vandborg Sorensen, Stockholm (SE)

(73) Assignee: SKYPE, Dublin (IE)

( * ) Notice: Subject to any disclaimer, the term of this patent is extended or adjusted under 35 U.S.C. 154(b) by 679 days.

(21) Appl. No.: 13/308,210

(22) Filed: Nov. 30, 2011

(65) Prior Publication Data

US 2013/0083936 A1    Apr. 4, 2013

(30) Foreign Application Priority Data

Sep. 30, 2011  (GB) .................................. 1116869.7

(51) Int. Cl.
*H04R 3/00*       (2006.01)
*G10L 21/02*      (2013.01)
*H04M 9/08*       (2006.01)
*G10L 21/0216*    (2013.01)
*G10L 21/0208*    (2013.01)

(52) U.S. Cl.
CPC ............... *G10L 21/02* (2013.01); *H04M 9/082* (2013.01); *G10L 2021/02166* (2013.01); *G10L 2021/02082* (2013.01)

(58) Field of Classification Search
USPC ..................... 381/91, 92, 122, 66, 94.1, 71.1; 379/406.08; 700/94; 455/570, 426.1; 369/24.01
See application file for complete search history.

(56) References Cited

U.S. PATENT DOCUMENTS

| | | |
|---|---|---|
| 4,849,764 A | 7/1989 | van Heyningen |
| 5,208,864 A * | 5/1993 | Kaneda ......................... 704/258 |
| 5,524,059 A | 6/1996 | Zurcher |
| 6,157,403 A | 12/2000 | Nagata |
| 6,232,918 B1 | 5/2001 | Wax et al. |
| 6,339,758 B1 | 1/2002 | Kanazawa et al. |
| 6,914,854 B1 | 7/2005 | Heberley et al. |
| 8,249,862 B1 | 8/2012 | Cheng et al. |

(Continued)

FOREIGN PATENT DOCUMENTS

| | | |
|---|---|---|
| CA | 2413217 | 5/2004 |
| CN | 100446530 | 3/2001 |

(Continued)

OTHER PUBLICATIONS

"Search Report", GB Application No. 1108885.3, (Sep. 3, 2012), 3 pages.

(Continued)

*Primary Examiner* — Vivian Chin
*Assistant Examiner* — Friedrich W Fahnert
(74) *Attorney, Agent, or Firm* — Sonia Cooper; Jim Ross; Micky Minhas

(57) ABSTRACT

Audio signals are processed for use in a communication event. A data store may be queried to obtain an indication of an echo direction, which relates to a direction from which audio signals output from the audio output are likely to be received at a microphone array (plurality of microphones) of a device. Beamformer coefficients of an adaptive beamformer of the device are determined in dependence upon the received indication of the echo direction. Audio signals are received at the microphone array. The adaptive beamformer applies the determined beamformer coefficients to the received audio signals, thereby generating a beamformer output for use in the communication event. The beamformer coefficients are determined such that echo suppression is applied to audio signals received at the microphone array from the indicated echo direction.

36 Claims, 6 Drawing Sheets

(56) References Cited

U.S. PATENT DOCUMENTS

| | | | |
|---|---|---|---|
| 8,325,952 B2 | 12/2012 | Cho | |
| 8,401,178 B2 | 3/2013 | Chen et al. | |
| 8,620,388 B2* | 12/2013 | Hayakawa et al. | 455/569.1 |
| 8,824,693 B2 | 9/2014 | Ahgren | |
| 8,891,785 B2 | 11/2014 | Sorensen | |
| 8,981,994 B2 | 3/2015 | Sorenson | |
| 2002/0015500 A1* | 2/2002 | Belt et al. | 381/66 |
| 2002/0103619 A1 | 8/2002 | Bizjak | |
| 2002/0171580 A1 | 11/2002 | Gaus et al. | |
| 2004/0213419 A1 | 10/2004 | Varma et al. | |
| 2005/0149339 A1 | 7/2005 | Tanaka et al. | |
| 2005/0216258 A1 | 9/2005 | Kobayashi et al. | |
| 2005/0232441 A1 | 10/2005 | Beaucoup et al. | |
| 2006/0015331 A1 | 1/2006 | Hui et al. | |
| 2006/0031067 A1* | 2/2006 | Kaminuma | 704/226 |
| 2006/0133622 A1 | 6/2006 | Chen | |
| 2006/0153360 A1* | 7/2006 | Kellermann et al. | 379/406.08 |
| 2006/0269073 A1 | 11/2006 | Mao | |
| 2007/0164902 A1 | 7/2007 | Bang et al. | |
| 2008/0039146 A1 | 2/2008 | Jin | |
| 2008/0199025 A1 | 8/2008 | Amada | |
| 2008/0232607 A1 | 9/2008 | Tashev et al. | |
| 2008/0260175 A1 | 10/2008 | Elko | |
| 2009/0010453 A1 | 1/2009 | Zurek et al. | |
| 2009/0076810 A1 | 3/2009 | Matsuo | |
| 2009/0076815 A1 | 3/2009 | Ichikawa et al. | |
| 2009/0125305 A1 | 5/2009 | Cho | |
| 2009/0274318 A1 | 11/2009 | Ishibashi et al. | |
| 2009/0304211 A1 | 12/2009 | Tashev et al. | |
| 2010/0027810 A1 | 2/2010 | Marton | |
| 2010/0070274 A1 | 3/2010 | Cho et al. | |
| 2010/0081487 A1 | 4/2010 | Chen et al. | |
| 2010/0103776 A1 | 4/2010 | Chan | |
| 2010/0128892 A1 | 5/2010 | Chen et al. | |
| 2010/0150364 A1* | 6/2010 | Buck et al. | 381/66 |
| 2010/0177908 A1 | 7/2010 | Seltzer et al. | |
| 2010/0215184 A1 | 8/2010 | Buck et al. | |
| 2010/0217590 A1 | 8/2010 | Nemer et al. | |
| 2010/0246844 A1 | 9/2010 | Wolff | |
| 2010/0296665 A1 | 11/2010 | Ishikawa et al. | |
| 2010/0315905 A1 | 12/2010 | Lee et al. | |
| 2010/0323652 A1 | 12/2010 | Visser et al. | |
| 2011/0038486 A1 | 2/2011 | Beaucoup | |
| 2011/0038489 A1 | 2/2011 | Visser et al. | |
| 2011/0054891 A1 | 3/2011 | Vitte et al. | |
| 2011/0070926 A1 | 3/2011 | Vitte et al. | |
| 2011/0158418 A1 | 6/2011 | Bai et al. | |
| 2011/0178798 A1 | 7/2011 | Flaks et al. | |
| 2012/0182429 A1 | 7/2012 | Forutanpour et al. | |
| 2012/0303363 A1 | 11/2012 | Sorensen | |
| 2013/0013303 A1 | 1/2013 | Strommer | |
| 2013/0034241 A1 | 2/2013 | Pandey et al. | |
| 2013/0082875 A1 | 4/2013 | Sorensen | |
| 2013/0083832 A1 | 4/2013 | Sorensen | |
| 2013/0083934 A1 | 4/2013 | Åhgren | |
| 2013/0083942 A1 | 4/2013 | Åhgren | |
| 2013/0083943 A1 | 4/2013 | Sorensen | |
| 2013/0129100 A1 | 5/2013 | Sorensen | |
| 2013/0136274 A1 | 5/2013 | Åhgren | |
| 2013/0148821 A1 | 6/2013 | Sorensen | |

FOREIGN PATENT DOCUMENTS

| | | |
|---|---|---|
| CN | 1406066 | 3/2003 |
| CN | 1698395 | 11/2005 |
| CN | 1809105 | 7/2006 |
| CN | 1815918 | 8/2006 |
| CN | 1835416 | 9/2006 |
| CN | 1885848 | 12/2006 |
| CN | 101015001 | 8/2007 |
| CN | 101018245 | 8/2007 |
| CN | 101207663 | 6/2008 |
| CN | 100407594 | 7/2008 |
| CN | 101278596 | 10/2008 |
| CN | 101455093 | 6/2009 |
| CN | 101625871 | 1/2010 |
| CN | 101667426 | 3/2010 |
| CN | 101685638 | 3/2010 |
| CN | 101828410 | 9/2010 |
| CN | 102111697 | 6/2011 |
| CN | 102131136 | 7/2011 |
| CN | 1540903 | 10/2014 |
| DE | 19943872 | 3/2001 |
| EP | 0002222 | 6/1979 |
| EP | 0654915 | 5/1995 |
| EP | 1722545 | 11/2006 |
| EP | 1919251 | 5/2008 |
| EP | 1930880 | 6/2008 |
| EP | 2026329 A1 | 2/2009 |
| EP | 2159791 | 3/2010 |
| EP | 2175446 | 4/2010 |
| EP | 2197219 | 6/2010 |
| EP | 2222091 | 8/2010 |
| EP | 2339574 | 6/2011 |
| JP | 2006109340 | 4/2006 |
| JP | 2006319448 | 11/2006 |
| JP | 2006333069 | 12/2006 |
| JP | 2010232717 | 10/2010 |
| TW | 201123175 | 7/2011 |
| WO | WO-0018099 | 3/2000 |
| WO | WO-03010996 | 2/2003 |
| WO | WO-2007127182 | 11/2007 |
| WO | WO-2008041878 | 4/2008 |
| WO | WO-2008062854 | 5/2008 |
| WO | WO-2010098546 | 9/2010 |
| WO | WO-2012097314 | 7/2012 |

OTHER PUBLICATIONS

"Search Report", GB Application No. 1111474.1, (Oct. 24, 2012), 3 pages.

"Search Report", GB Application No. 1116847.3, (Dec. 20, 2012), 3 pages.

"International Search Report", Mailed Date: May 3, 2013, Application No. PCT/US2012/058148, Filed date: Sep. 29, 2012, pp. 9.

Kellermann, Walter, "Strategies for Combining Acoustic Echo Cancellation and Adaptive Beamforming Microphone Arrays", Retrieved at <<http://ieeexplore.ieee.org/stamp/stamp.jsp?tp=&arnumber=599608>>, In IEEE International Conference on Acoustics, Speech, and Signal Processing, vol. 1, Apr. 21, 1997, pp. 4.

"PCT Search Report and Written Opinion", Application No. PCT/US2012/068649, (Mar. 7, 2013), 9 pages.

"PCT Search Report and Written Opinion", Application No. PCT/US2012/058147, (May 8, 2013), 9 pages.

"PCT Search Report and Written Opinion", Application No. PCT/US2012/058143, (Dec. 21, 2012), 12 pages.

Goldberg, et al., "Joint Direction-of-Arrival and Array Shape Tracking for Multiple Moving Targets", *IEEE International Conference on Acoustics, Speech, and Signal Processing*, (Apr. 21, 1997), pp. 511-514.

Handzel, et al., "Biomimetic Sound-Source Localization", *IEEE Sensors Journal*, vol. 2, No. 6, (Dec. 2002), pp. 607-616.

"Search Report", Application No. GB1116846.5, Jan. 28, 2013, 3 pages.

"Search Report", GB Application No. 1116840.8, Jan. 29, 2013, 3 pages.

"Search Report", GB Application No. 1116843.2, Jan. 30, 2013, 3 pages.

"Search Report", GB Application No. 1116869.7, Feb. 7, 2013, 3 pages.

"Search Report", GB Application No. 1121147.1, Feb. 14, 2013, 5 pages.

"UK Search Report", UK Application No. GB1116848.1, Dec. 18, 2012, 3 pages.

"Foreign Office Action", CN Application No. 201210377130.8, Jan. 15, 2014, 12 pages.

"International Search Report and Written Opinion", Application No. PCT/EP2012/059937, Feb. 14, 2014, 9 pages.

"Non-Final Office Action", U.S. Appl. No. 13/327,308, Mar. 28, 2014, 13 pages.

(56) References Cited

OTHER PUBLICATIONS

"Notice of Allowance", U.S. Appl. No. 13/307,994, Apr. 1, 2014, 7 pages.
"International Search Report and Written Opinion", Application No. PCT/US2013/058144, (Sep. 11, 2013),10 pages.
"Non-Final Office Action", U.S. Appl. No. 13/212,633, (Nov. 1, 2013),14 pages.
"Non-Final Office Action", U.S. Appl. No. 13/212,688, (Nov. 7, 2013),14 pages.
Knapp, et al., "The Generalized Correlation Method for Estimation of Time Delay", *IEEE Transactions on Acoustics, Speech, and Signal Processing*, vol. ASSP-24, No. 4, (Aug. 1976), pp. 320-327.
"Non-Final Office Action", U.S. Appl. No. 13/341,610, Dec. 27, 2013, 10 pages.
"Non-Final Office Action", U.S. Appl. No. 13/307,994, Dec. 19, 2013, 12 pages.
"Non-Final Office Action", U.S. Appl. No. 13/307,852, Feb. 20, 2014, 5 pages.
"Search Report", GB Application No. 1119932.0, Feb. 28, 2013, 8 pages.
"Foreign Office Action", CN Application No. 201210368101.5, Dec. 6, 2013, 9 pages.
"PCT Search Report and Written Opinion", Application No. PCT/US/2012/045556, (Jan. 2, 2013),10 pages.
"PCT Search Report and Written Opinion", Application No. PCT/US2012/058146, (Jan. 21, 2013),9 pages.
"PCT Search Report and Written Opinion", Application No. PCT/US2012/066485, (Feb. 15, 2013),12 pages.
"PCT Search Report and Written Opinion", Application No. PCT/US2012/2065737, (Feb. 13, 2013),12 pages.
"PCT Search Report and Written Opinion", Application No. PCT/US2012/058145, (Apr. 24, 2013),18 pages.
Grbic, Nedelko et al., "Soft Constrained Subband Beamforming for Hands-Free Speech Enhancement", *In Proceedings of ICASSP 2002*, (May 13, 2002),4 pages.
"Foreign Office Action", CN Application No. 201210367888.3, Jul. 15, 2014, 13 pages.
"Foreign Office Action", CN Application No. 201210368101.5, Jun. 20, 2014, 7 pages.
"Foreign Office Action", CN Application No. 201210377115.3, Aug. 27, 2014, 18 pages.
"Foreign Office Action", CN Application No. 201210377215.6, Mar. 24, 2014, 16 pages.
"Foreign Office Action", CN Application No. 201210462710.7, Mar. 5, 2014, 12 pages.
"Non-Final Office Action", U.S. Appl. No. 13/327,250, Sep. 15, 2014, 10 pages.
"Notice of Allowance", U.S. Appl. No. 13/307,852, Sep. 12, 2014, 4 pages.
"Supplemental Notice of Allowance", U.S. Appl. No. 13/307,852, Oct. 22, 2014, 2 pages.
Goldberg, et al.,' "Joint Direction-of-Arrival and Array-Shape Tracking for Multiple Moving Targets", IEEE International Conference on Acoustic, Speech, and Signal Processing, Apr. 25, 1997, 4 pages.
"Corrected Notice of Allowance", U.S. Appl. No. 13/307,994, Jun. 24, 2014, 2 pages.
"Final Office Action", U.S. Appl. No. 13/212,633, May 23, 2014, 16 pages.
"Final Office Action", U.S. Appl. No. 13/212,688, Jun. 5, 2014, 20 pages.
"Final Office Action", U.S. Appl. No. 13/341,610, Jul. 17, 2014, 7 pages.
"Foreign Office Action", CN Application No. 201210368224.9, Jun. 5, 2014, 11 pages.
"Non-Final Office Action", U.S. Appl. No. 13/307,852, May 16, 2014, 4 pages.
"Non-Final Office Action", U.S. Appl. No. 13/308,165, Jul. 17, 2014, 14 pages.
"Notice of Allowance", U.S. Appl. No. 13/308,106, Jun. 27, 2014, 7 pages.
"Supplemental Notice of Allowance", U.S. Appl. No. 13/307,994, Aug. 8, 2014, 2 pages.
"Corrected Notice of Allowance", U.S. Appl. No. 13/307,852, Dec. 18, 2014, 2 pages.
"Final Office Action", U.S. Appl. No. No. 13/327,308, Dec. 2, 2014, 6 pages.
"Foreign Office Action", CN Application No. 201210377130.8, Sep. 28, 2014, 7 pages.
"Foreign Office Action", CN Application No. 201210485807.X, Oct. 8, 2014, 10 pages.
"Foreign Office Action", CN Application No. 201210521742.X, Oct. 8, 2014, 16 pages.
"Non-Final Office Action", U.S. Appl. No. 13/212,633, Nov. 28, 2014, 16 pages.
"Foreign Office Action", GB Application No. 1121147.1, Apr. 25, 2014, 2 pages.
"Corrected Notice of Allowance", U.S. Appl. No. 13/307,852, Feb. 20, 2015, 2 pages.
"Corrected Notice of Allowance", U.S. Appl. No. 13/308,165, Feb. 17, 2015, 2 pages.
"Foreign Notice of Allowance", CN Application No. 201210368224.9, Jan. 06, 2015, 3 pages.
"Foreign Notice of Allowance", CN Application No. 201210377130.8, Jan. 17, 2015, 3 pages.
"Foreign Notice of Allowance", CN Application No. 201210462710.7, Jan. 6, 2015, 6 pages.
"Foreign Office Action", CN Application No. 201210377215.6, Jan. 23, 2015, 11 pages.
"Foreign Office Action", CN Application No. 201280043129.X, Dec. 17, 2014, 8 pages.
"Foreign Office Action", EP Application No. 12809381.2, Feb. 9, 2015, 8 pages.
"Foreign Office Action", EP Application No. 12878205.9, Feb. 9, 2015, 6 pages.
"Non-Final Office Action", U.S. Appl. No. 13/212,688, Feb. 27, 2015, 23 pages.
"Notice of Allowance", U.S. Appl. No. 13/308,165, Dec. 23, 2014, 7 pages.
"Notice of Allowance", U.S. Appl. No. 13/327,250, Jan. 5, 2015, 9 pages.
"Notice of Allowance", U.S. Appl. No. 13/341,610, Dec. 26, 2014, 8 pages.

* cited by examiner

PROCESSING AUDIO SIGNALS

RELATED APPLICATION

This application claims priority under 35 U.S.C. §119 or 365 to Great Britain, Application No. GB1116869.7, filed Sep. 30, 2011. The entire teachings of the above application are incorporated herein by reference.

TECHNICAL FIELD

The present invention relates to processing audio signals received at a device.

BACKGROUND

A device may have audio input means such as a microphone that can be used to receive audio signals from the surrounding environment. For example, a microphone of a user device may receive a primary audio signal (such as speech from a user) as well as other audio signals. The other audio signals may be interfering audio signals received at the microphone of the device, and may be received from an interfering source or may be ambient background noise or microphone self-noise. The interfering audio signals may disturb the primary audio signals received at the device. The device may use the received audio signals for many different purposes. For example, where the received audio signals are speech signals received from a user, the speech signals may be processed by the device for use in a communication event, e.g. by transmitting the speech signals over a network to another device which may be associated with another user of the communication event. Alternatively, or additionally, the received audio signals could be used for other purposes, as is known in the art.

In order to improve the quality of the received audio signals, (e.g. the speech signals received from a user for use in a call), it is desirable to suppress interfering audio signals (e.g. background noise and interfering audio signals received from interfering audio sources) that are received at the microphone of the user device.

The use of stereo microphones and other microphone arrays in which a plurality of microphones operate as a single audio input means is becoming more common. The use of a plurality of microphones at a device enables the use of extracted spatial information from the received audio signals in addition to information that can be extracted from an audio signal received by a single microphone. When using such devices one approach for suppressing interfering audio signals is to apply a beamformer to the audio signals received by the plurality of microphones. Beamforming is a process of focussing the audio signals received by a microphone array by applying signal processing to enhance particular audio signals received at the microphone array from one or more desired locations (i.e. directions and distances) compared to the rest of the audio signals received at the microphone array. For simplicity we will describe the case with only a single desired direction herein, but the same method will apply when there are more directions of interest. The angle (and/or the distance) from which the desired audio signal is received at the microphone array, so-called Direction of Arrival ("DOA") information, can be determined or set prior to the beamforming process. It can be advantageous to set the desired direction of arrival to be fixed since the estimation of the direction of arrival may be complex. However, in alternative situations it can be advantageous to adapt the desired direction of arrival to changing conditions, and so it may be advantageous to perform the estimation of the desired direction of arrival in real-time as the beamformer is used. Adaptive beamformers apply a number of weights (or "beamformer coefficients") to the received audio signals.

These weights can be adapted to take into account the DOA information to process the audio signals received by the plurality of microphones to form a "beam" whereby a high gain is applied to desired audio signals received by the microphones from a desired location (i.e. a desired direction and distance) and a low gain is applied in the directions to any other (e.g. interfering) signal sources. The beamformer may be "adaptive" in the sense that the suppression of interfering sources can be adapted, but the selection of the desired source/look direction may not necessarily be adaptable.

As well as having a plurality of microphones for receiving audio signals, a device may also have audio output means (e.g. comprising a loudspeaker) for outputting audio signals. Such a device is useful, for example where audio signals are to be outputted to, and received from, a user of the device, for example during a communication event. For example, the device may be a user device such as a telephone, computer or television and may include equipment necessary to allow the user to engage in teleconferencing.

Where a device includes both audio output means (e.g. including a loudspeaker) and audio input means (e.g. microphones) then there is often a problem when an echo is present in the received audio signals, wherein the echo results from audio signals being output from the loudspeaker and received at the microphones. The audio signals being output from the loudspeaker include echo and also other sounds played by the loudspeaker, such as music or audio, e.g., from a video clip.

When echo is present in audio signals received at a device which implements a beamformer as described above, the echo can be treated as interference in the received audio signals and the beamformer coefficients can be adapted such that the beamformer applies a low gain to the audio signals arriving from the direction (and/or distance) of the echo signals. When a communication event begins, the beamformer has no knowledge of the angle (and/or distance) from which the loudspeaker signal (which includes echo) will arrive until the first instance of far end activity (e.g. speech from the far end user) in the communication event. Once the first instance of far end activity has occurred in the communication event, the device can analyze the audio signals received at the microphones of the device in order to determine the echo direction and can then adapt the beamformer coefficients such that echo suppression is applied by the beamformer to audio signals which are received from the echo direction.

In adaptive beamformers a highly desired property is to have a slowly evolving beampattern. Fast changes to the beampattern tend to cause audible changes in the background noise characteristics, and as such are not perceived as natural. Therefore when adapting the beamformer coefficients in response to the first instance of far end activity in a communication event as described above, there is a trade-off to be made between quickly suppressing the echo, and not changing the beampattern too quickly.

SUMMARY

In embodiments of the present invention the beamformer is initialized given the angle from which echo is typically received, based on collected statistics from a high number of similar devices. In embodiments of the invention, when devices of a communication system engage in communication events they determine the echo direction during the communication event, e.g. using correlation based methods, and they transmit echo direction data to a server of the communication system preferably along with information that will identify the type of device that is running the software, and the server can then store the echo direction data from multiple devices of the communication system along with the device identifiers. The echo direction data stored by the server can be used to determine a likely echo direction for other similar devices of the communication system, and an indication of the likely echo direction may be transmitted to the devices so that those devices can initialize their beamformers to apply echo suppression in the likely echo direction in a communication event prior to the first instance of far end activity in the communication event. In this way, in embodiments of the invention, where the initial echo direction matches the actual echo direction, the beamformer is prepared for an echo to arrive and will have full echo suppression already before the first case of far end activity in the communication event. Thus, in these cases the beampattern does not need to be subsequently changed as a result of the first far end activity for echo suppression. If the initial echo direction does not match the actual echo direction in the communication event then the beamformer coefficients are adapted slowly in order to apply echo suppression to the echo in the communication event, which causes a similar distortion of the beampattern as in the prior art described above.

According to a first aspect of the invention there is provided a method of processing audio signals at a device for use in a communication event, the device comprising an audio output for outputting audio signals of the communication event, the method comprising: the device querying a data store to obtain an indication of an echo direction from which audio signals output from the audio output are likely to be received at a microphone array of the device, said microphone array comprising a plurality of microphones; determining beamformer coefficients of an adaptive beamformer of the device in dependence upon the obtained indication of the echo direction; receiving audio signals at the plurality of microphones of the microphone array; and the adaptive beamformer applying the determined beamformer coefficients to the received audio signals, thereby generating a beamformer output for use in the communication event, wherein the beamformer coefficients are determined such that the adaptive beamformer applies echo suppression to audio signals received at the microphone array from the indicated echo direction.

Advantageously, the device can use the indication of the echo direction obtained from the data store to determine the beamformer coefficients such that the beamformer applies echo suppression to the audio signals received at the microphone array from the indicated echo direction. This allows the beamformer to be initialized based on the likely echo direction for a communication event before the first instance of far end activity in the communication event. This avoids a need to test the device in a lab and initialize the beamformer based on manual measurements of the echo direction for the particular device.

When manual effort is not feasible, e.g., when the number of devices on which the beamformer is implemented is very large such that manually initializing each device is impractical, it becomes particularly advantageous to automate the initialization process. This is achieved in embodiments of the present invention by obtaining the indication of the echo direction from the data store. In this way the initialization process can be automated and used with a large number of devices, which can each query the data store to obtain an indication of an echo direction.

After the beamformer coefficients have been initially determined as described above, once far end activity begins in a communication event, the device can adapt the beamformer coefficients according to the actual echo direction, for example using correlation based methods. If the indicated echo direction obtained from the data store matches (or is close to) the actual echo direction then the beamformer coefficients will need little, or no, adjustment once the far end activity begins. Therefore the beampattern of the beamformer will, advantageously, experience little or no distortion as a result of the far end activity commencing in the communication event.

The method may further comprise: outputting audio signals of the communication event from the audio output; determining an actual echo direction from which the outputted audio signals are received at the microphone array; and if the actual echo direction is different from the indicated echo direction then adapting the beamformer coefficients such that the adaptive beamformer applies echo suppression to audio signals received at the microphone array from the actual echo direction.

The step of querying the data store may comprise querying the data store with an identifier of the device. In response to the step of querying the data store the method may further comprise: using the identifier of the device to retrieve, from the data store, echo direction data received from at least one other device having an identifier which corresponds to the identifier of the device; and using the retrieved echo direction data to determine the echo direction for the device. The identifier of the at least one other device may correspond to the identifier of the device if the device is at least one of: (i) the same type, (ii) the same model and (iii) the same category, as the at least one other device. There may be a plurality of said other devices, and the echo direction for the device may be determined based on averaged statistics of the echo direction data received from the plurality of other devices. The method may further comprise determining that the echo direction data received from the plurality of other devices indicates that a particular echo direction is the most common for the plurality of other devices and setting the echo direction for the device to be the particular echo direction. The method may further comprise: receiving echo direction data from the at least one other device, said echo direction data received from each of the at least one other device comprising: (i) data relating to an echo direction from which echoes are received during a communication event at that other device, and (ii) an identifier of that other device; and storing the received echo direction data in the data store.

The data store may be at the device. Alternatively, the data store may be at a server, and the step of querying a data store may comprise: transmitting a query from the device to the server; and receiving, at the device from the server, said indication of the echo direction. The indication of the echo direction may be broadcast from the server to the device.

The method may further comprise: determining, at the device, echo direction data relating to an echo direction from which echoes are received during a communication event at the device; and storing, in the data store, the determined echo direction data, wherein the determined echo direction data stored in the data store is used to determine the indication of the echo direction which is obtained in said step of querying the data store.

According to a second aspect of the invention there is provided a device for processing audio signals for use in a communication event, the device comprising: an audio output for outputting audio signals of the communication event; a microphone array comprising a plurality of microphones for receiving audio signals; means for querying a data store to obtain an indication of an echo direction from which audio signals output from the audio output are likely to be received at the microphone array; an adaptive beamformer for applying beamformer coefficients to the audio signals received at the plurality of microphones, thereby generating a beamformer output for use in the communication event; and means for determining said beamformer coefficients in dependence upon the obtained indication of the echo direction, wherein the means for determining means is configured to determine the beamformer coefficients such that the adaptive beamformer applies echo suppression to audio signals received at the microphone array from the indicated echo direction.

The device may further comprise: means for determining an actual echo direction from which outputted audio signals outputted from the audio output are received at the microphone array; and means for adapting the beamformer coefficients, if the actual echo direction is different from the indicated echo direction, such that the adaptive beamformer applies echo suppression to audio signals received at the microphone array from the actual echo direction.

The means for querying may be configured to query the data store with an identifier of the device.

The device may further comprise said data store. Alternatively, the data store may be at a server, and the means for querying may be configured to: transmit a query to the server; and receive, from the server, said indication of the echo direction.

According to a third aspect of the invention there is provided a computer program product for processing audio signals at a device for use in a communication event, the device comprising an audio output for outputting audio signals of the communication event, the computer program product being embodied on a non-transient computer-readable medium and configured so as when executed on a processor of the device to perform the method steps performed at the device as described herein.

According to a fourth aspect of the invention there is provided a system for processing audio signals for use in a communication event, the system comprising: a device comprising: an audio output for outputting audio signals of the communication event; a microphone array comprising a plurality of microphones for receiving audio signals; means for querying a data store to obtain an indication of an echo direction from which audio signals output from the audio output means are likely to be received at the microphone array; an adaptive beamformer for applying beamformer coefficients to the received audio signals, thereby generating a beamformer output for use in the communication event; and means for determining said beamformer coefficients in dependence upon the obtained indication of the echo direction, wherein the means for determining is configured to determine the beamformer coefficients such that the adaptive beamformer applies echo suppression to audio signals received at the microphone array from the indicated echo direction; and a server comprising: the data store; means for determining the echo direction; and means for providing the indication of the echo direction to the device in response to a query from the means for querying.

According to a fifth aspect of the invention there is provided a method of processing audio signals in a communication system, the method comprising: determining echo direction data at a plurality of devices of the communication system, said echo direction data determined at each one of the plurality of devices comprising: (i) data relating to an echo direction from which echoes are received during a communication event at that one of the plurality of devices, and (ii) an identifier of that one of the plurality of devices; transmitting the determined echo direction data from the plurality of devices to a data store of the communication system; storing the echo direction data received from the plurality of devices at the data store; querying the data store with an identifier of a particular device of the communication system; using the identifier of the particular device to retrieve, from the data store, echo direction data received from at least one of said plurality of devices having an identifier which corresponds to the identifier of the particular device; using the retrieved echo direction data to determine an echo direction for the particular device; determining beamformer coefficients of an adaptive beamformer of the particular device in dependence upon the indication of the echo direction; receiving audio signals at a plurality of microphones of a microphone array of the particular device; and the adaptive beamformer applying the determined beamformer coefficients to the received audio signals, thereby generating a beamformer output for use in a communication event, wherein the beamformer coefficients are determined such that the adaptive beamformer applies echo suppression to audio signals received at the microphone array from the indicated echo direction.

According to a sixth aspect of the invention there is provided a communication system for processing audio signals, the communication system comprising:—a plurality of devices comprising: determining means for determining echo direction data, said echo direction data determined at each one of the plurality of devices comprising: (i) data relating to an echo direction from which echoes are received during a communication event at that one of the plurality of devices, and (ii) an identifier of that one of the plurality of devices; and means for transmitting the determined echo direction data from the plurality of devices to a server;—a server comprising: means for receiving the transmitted echo direction data from the plurality of devices; a data store for storing the received echo direction data; means for using an identifier of a particular device of the communication system to retrieve, from the data store, echo direction data received from at least one of said plurality of devices having an identifier which corresponds to the identifier of the particular device; means for using the retrieved echo direction data to determine an echo direction for the particular device; and means for providing an indication of the determined echo direction to the particular device; and—a particular device comprising: an audio output for outputting audio signals of a communication event; a microphone array comprising a plurality of microphones for receiving audio signals; means for querying the data store to obtain the indication of the determined echo direction provided by the server; an adaptive beamformer for applying beamformer coefficients to the received audio signals, thereby generating a beamformer output for use in the communication event; and means for determining said beamformer coefficients in dependence upon the obtained indication of the determined echo direction, wherein the means for determining is configured to determine the beamformer coefficients such that the adaptive beamformer applies echo suppression to audio signals received at the microphone array from the indicated echo direction.

According to a seventh aspect of the invention there is provided a method of processing data at a server of a communication system, the method comprising: receiving, at the server, echo direction data from a plurality of devices of the communication system, said echo direction data received from each one of the plurality of devices comprising: (i) data relating to an echo direction from which echoes are received during a communication event at that one of the plurality of devices, and (ii) an identifier of that one of the plurality of devices; storing the received echo direction data in a data store; determining an identifier of a particular device of the communication system; using the identifier of the particular device to retrieve, at the server from the data store, echo direction data received from at least one of said plurality of devices having an identifier which corresponds to the identifier of the particular device; using the retrieved echo direction data to determine, at the server, an echo direction for the particular device; and providing an indication of the determined echo direction to the particular device.

The step of determining an identifier of the particular device may comprise receiving, at the server from the device, a query for echo direction data, said query including the identifier of the particular device.

The step of providing an indication of the determined echo direction may comprise transmitting the indication of the determined echo direction from the server to the particular device.

The step of transmitting an indication of the determined echo direction from the server to the particular device may comprise broadcasting the indication of the determined echo direction.

The identifier of the at least one of said plurality of devices may correspond to the identifier of the particular device if the particular device is at least one of: (i) the same type, (ii) the same model and (iii) the same category, as the at least one of said plurality of devices.

There may be a plurality of said devices having an identifier which corresponds to the identifier of the particular device, and the echo direction for the particular device may be determined based on averaged statistics of the echo direction data received from the plurality of said devices having an identifier which corresponds to the identifier of the particular device.

The method may further comprise determining that the echo direction data retrieved from the data store indicates that a particular echo direction is the most common for the plurality of said devices having an identifier which corresponds to the identifier of the particular device and setting the echo direction for the particular device to be the particular echo direction.

According to an eighth aspect of the invention there is provided a server for processing data, the server being part of a communication system, the server comprising: means for receiving echo direction data from a plurality of devices of the communication system, said echo direction data for each one of the plurality of devices comprising: (i) data relating to an echo direction from which echoes are received during a communication event at that one of the plurality of devices, and (ii) an identifier of that one of the plurality of devices; a data store for storing the received echo direction data; means for determining an identifier of a particular device of the communication system; means for using the identifier of the particular device to retrieve, from the data store, echo direction data received from at least one of said plurality of devices having an identifier which corresponds to the identifier of the particular device; means for using the retrieved echo direction data to determine an echo direction for the particular device; and means for providing an indication of the determined echo direction to the particular device.

According to a ninth aspect of the invention there is provided a computer program product for processing audio signals at a server of a communication system, the computer program product being embodied on a non-transient computer-readable medium and configured so as when executed on a processor of the server to perform the method steps performed at the server as described herein.

According to a tenth aspect of the invention there is provided a method of processing data in a communication system, the method comprising: determining echo direction data at a plurality of devices of the communication system, said echo direction data determined at each one of the plurality of devices comprising: (i) data relating to an echo direction from which echoes are received during a communication event at that one of the plurality of devices, and (ii) an identifier of that one of the plurality of devices; transmitting the determined echo direction data from the plurality of devices to a server of the communication system; storing the echo direction data received at the server from the plurality of devices in a data store; determining an identifier of a particular device of the communication system; using the identifier of the particular device to retrieve, at the server from the data store, echo direction data received from at least one of said plurality of devices having an identifier which corresponds to the identifier of the particular device; using the retrieved echo direction data to determine, at the server, an echo direction for the particular device; and providing an indication of the determined echo direction for the particular device to the particular device.

The step of determining echo direction data at a plurality of devices may comprise, for each one of the plurality of devices, gathering information relating to the echo direction from which echoes are received throughout the communication event at that one of the plurality of devices. The gathering information may include updating a direction of arrival estimate during echo activity of the communication event at that one of the plurality of devices.

The method may further comprise, for each one of the plurality of devices, using the direction of arrival estimate at the end of the communication event at that one of the plurality of devices to determine the echo direction data that is transmitted to the server.

According to an eleventh aspect of the invention there is provided a communication system for processing data, the communication system comprising: a plurality of devices comprising: means for determining echo direction data, said echo direction data determined at each one of the plurality of devices comprising: (i) data relating to an echo direction from which echoes are received during a communication event at that one of the plurality of devices, and (ii) an identifier of that one of the plurality of devices; and means for transmitting the determined echo direction data from the plurality of devices to a server; and a server comprising: means for receiving the transmitted echo direction data from the plurality of devices; a data store for storing the received echo direction data; means for determining an identifier of a particular device of the communication system; means for using the identifier of the particular device to retrieve, from the data store, echo direction data received from at least one of said plurality of devices having an identifier which corresponds to the identifier of the particular device; means for using the retrieved echo direction data to determine an echo direction for the particular device; and means for providing an indication of the determined echo direction to the particular device.

BRIEF DESCRIPTION OF THE DRAWINGS

For a better understanding of the present invention and to show how the same may be put into effect, reference will now be made, by way of example, to the following drawings in which.

DETAILED DESCRIPTION

Preferred embodiments of the invention will now be described by way of example only. In preferred embodiments beamformer coefficients of a beamformer at a first device of a communication system are initialized based on an indication of an echo direction received from a server of the communication system. The server determines the indication of the echo direction based upon echo direction data received from other devices of the communication system which are similar to the first device (e.g. from other devices which are of the same type and model as the first device or of the same device category, e.g. a TV). This allows the beamformer to apply echo suppression in the echo direction before the first instance of far end activity in a communication event.

Figure 1:
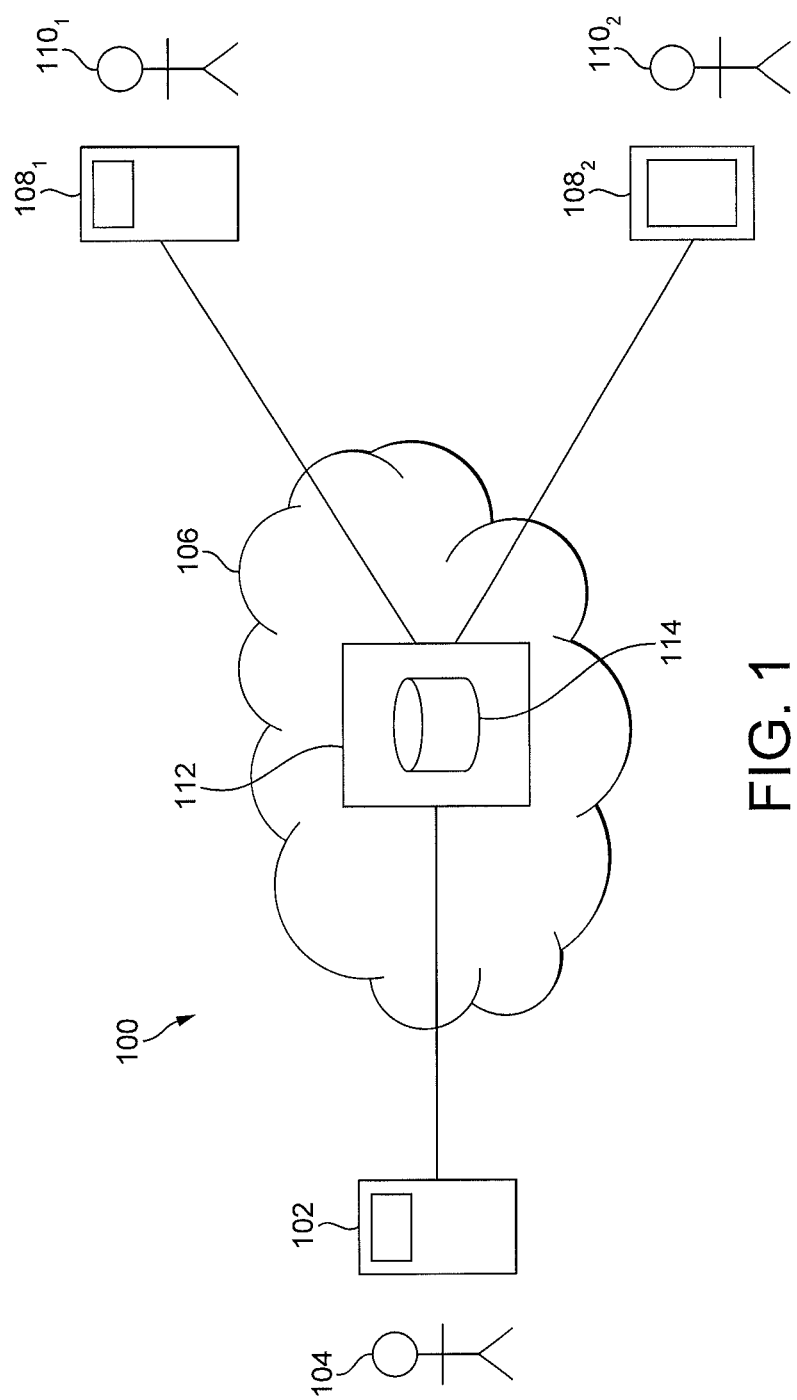
FIG. 1 shows a communication system according to a preferred embodiment.

Reference is first made to FIG. 1 which illustrates a communication system 100 according to a preferred embodiment. The communication system 100 comprises a first device 102 which is associated with a first user 104. The first device 102 is connected to a server 112 of the communication system 100, e.g. via network 106. The server 112 comprises a data storage means such as database 114. The communication system 100 also comprises a plurality of other devices $108_1$ and $108_2$ which are associated with a respective plurality of other users $110_1$ and $110_2$. The devices $108_1$ and $108_2$ are connected to the server 112 via the network 106. Only two devices 108 are shown in FIG. 1 for clarity, but it will be appreciated that more than two devices 108 may be connected to the server 112 in a similar manner to that shown in FIG. 1 for devices $108_1$ and $108_2$. The devices of the communication system 100 (e.g. devices 102, $108_1$ and $108_2$) can communicate with each other over the network 106 in the communication system 100, thereby allowing users (e.g. the users 104, $110_1$ and $110_2$) to engage in communication events to thereby communicate with each other. The network 106 may, for example, be the Internet. Each of the devices 102, $108_1$ and $108_2$ may be, for example, a mobile phone, a personal digital assistant ("PDA"), a personal computer ("PC") (including, for example, Windows™, Mac OS™ and Linux™ PCs), a laptop, a television, a gaming device or other embedded device able to connect to the network 106. The device 102 is arranged to receive information from and output information to the user 104.

Figure 2:
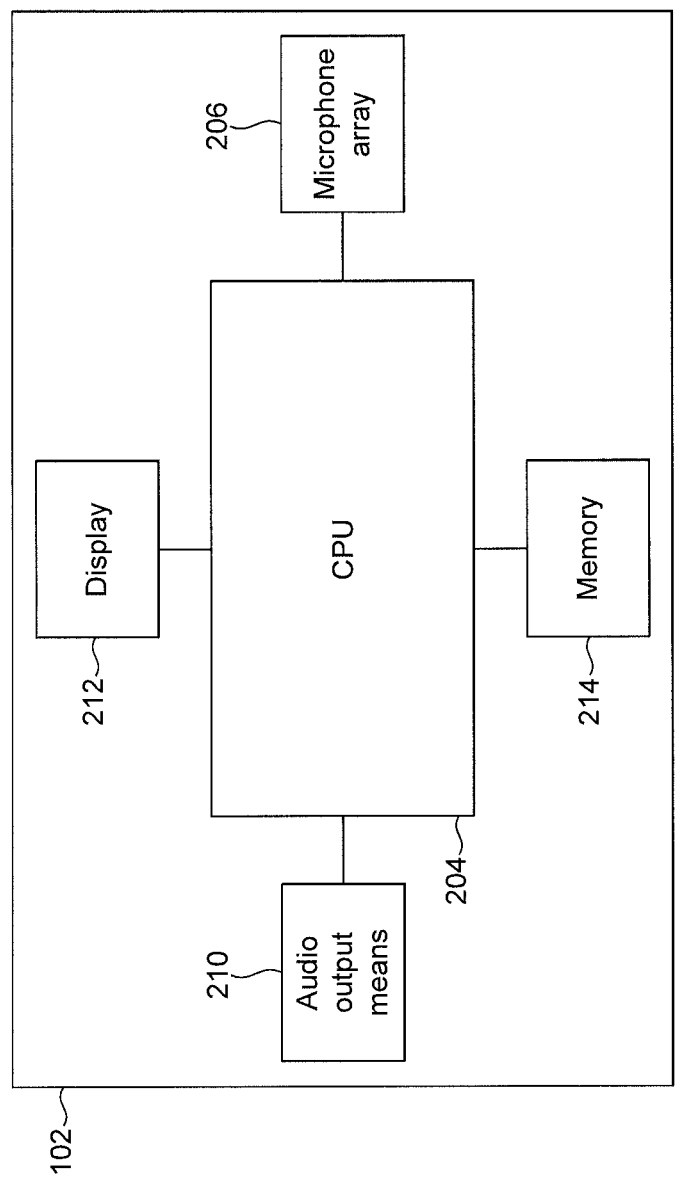
FIG. 2 shows a schematic view of a device according to a preferred embodiment.

Reference is now made to FIG. 2 which illustrates a schematic view of the device 102. The device 102 may be a fixed or a mobile device. The device 102 comprises a CPU 204, to which is connected a microphone array 206 for receiving audio signals, audio output means 210 for outputting audio signals, a display 212 such as a screen for outputting visual data to the user 104 of the device 102 and a memory 214 for storing data.

Figure 3:
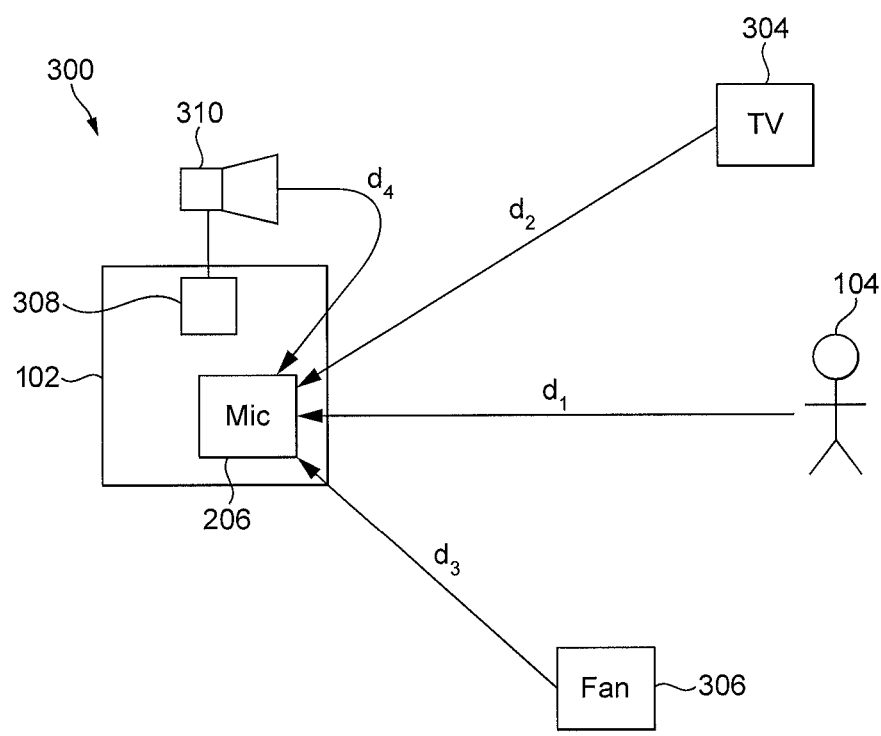
FIG. 3 shows an environment in which a device according to a preferred embodiment operates.

Reference is now made to FIG. 3, which illustrates an example environment 300 in which the device 102 operates.

The microphone array 206 of the device 102 receives audio signals from the environment 300. For example, as shown in FIG. 3, the microphone array 206 receives audio signals from a user 104 (as denoted $d_1$ in FIG. 3), audio signals from a TV 304 (as denoted $d_2$ in FIG. 3), audio signals from a fan 306 (as denoted $d_3$ in FIG. 3) and audio signals from a loudspeaker 310 (as denoted $d_4$ in FIG. 3). The audio output means 210 of the device 102 comprise audio output processing means 308 and the loudspeaker 310. The audio output processing means 308 operates to send audio output signals to the loudspeaker 310 for output from the loudspeaker 310. The loudspeaker 310 may be implemented within the housing of the device 102. Alternatively, the loudspeaker 310 may be implemented outside of the housing of the device 102. The audio output processing means 308 may operate as software executed on the CPU 204, or as hardware in the device 102. It will be apparent to a person skilled in the art that the microphone array 206 may receive other audio signals than those shown in FIG. 3. In the scenario shown in FIG. 3 the audio signals from the user 104 are the desired audio signals, and all the other audio signals which are received at the microphone array 206 are interfering audio signals. In other embodiments more than one of the audio signals received at the microphone array 206 may be considered "desired" audio signals, but for simplicity, in the embodiments described herein there is only one desired audio signal (that being the audio signal from user 104) and the other audio signals are considered to be interference. Other sources of unwanted noise signals may include for example air-conditioning systems, a device playing music, other users in the environment and reverberance of audio signals, e.g. off a wall in the environment 300.

Figure 4:
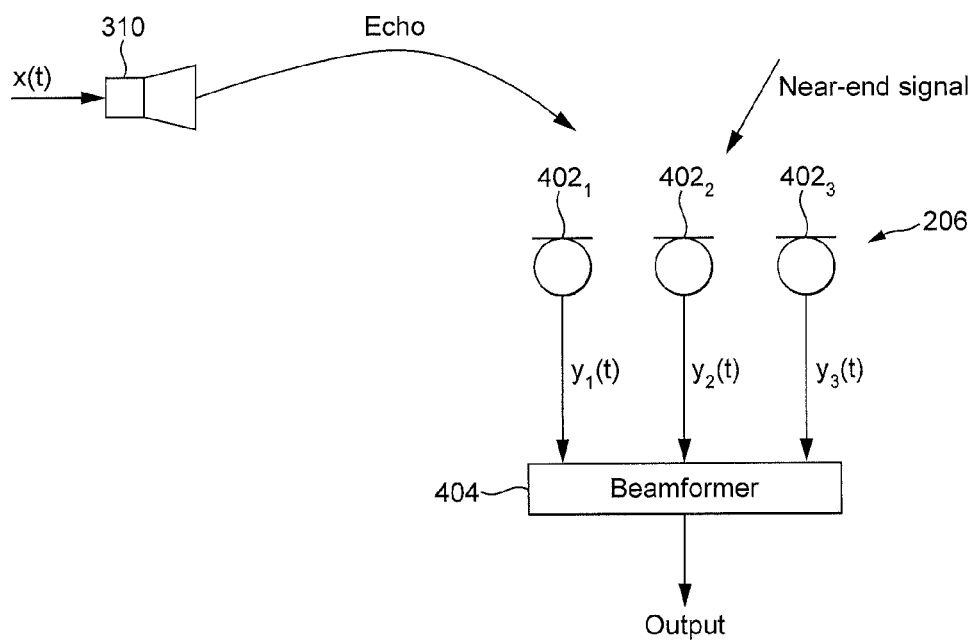
FIG. 4 shows a functional block diagram of elements of a device according to a preferred embodiment.

Reference is now made to FIG. 4 which illustrates a functional representation of elements of the device 102 according to a preferred embodiment of the invention. The microphone array 206 comprises a plurality of microphones $402_1$, $402_2$ and $402_3$. The device 102 further comprises a beamformer 404 which may, for example, be a Minimum Variance Distortionless Response (MVDR) beamformer. The beamformer 404 may be implemented in software executed on the CPU 204 or implemented in hardware in the device 102. The output of each microphone in the microphone array 206 is coupled to a respective input of the beamformer 404. Persons skilled in the art will appreciate that multiple inputs are needed in order to implement beamforming. The microphone array 206 is shown in FIG. 4 as having three microphones ($402_1$, $402_2$ and $402_3$), but it will be understood that this number of microphones is merely an example and is not limiting in any way.

The beamformer 404 includes means for receiving and processing the audio signals $y_1(t)$, $y_2(t)$ and $y_3(t)$ from the microphones $402_1$, $402_2$ and $402_3$ of the microphone array 206. For example, the beamformer 404 may comprise a voice activity detector (VAD) and a DOA estimation block (not shown in the Figures). In operation the beamformer 404 ascertains the nature of the audio signals received by the microphone array 206 and based on detection of speech like qualities detected by the VAD and the DOA estimation block, one or more principal direction(s) of the main speaker(s) is determined. In other embodiments the principal direction(s) of the main speaker(s) may be pre-set such that the beamformer 404 focuses on fixed directions. In the example shown in FIG. 3 the direction of audio signals ($d_1$) received from the user 104 is determined to be the principal direction. The beamformer 404 may use the DOA information (or may simply use the fixed look direction which is pre-set for use by the beamformer 404) to process the audio signals by forming a beam that has a high gain in the direction from the principal direction ($d_1$) from which wanted signals are received at the microphone array 206 and a low gain in the directions to any other signals (e.g. $d_2$, $d_3$ and $d_4$).

The beamformer 404 can also determine the interfering directions of arrival ($d_2$, $d_3$ and $d_4$), and advantageously the behavior of the beamformer 404 can be adapted such that particularly low gains are applied to audio signals received from those interfering directions of arrival in order to suppress the interfering audio signals. Whilst it has been described above that the beamformer 404 can determine any number of principal directions, the number of principal directions determined affects the properties of the beamformer, e.g. for a large number of principal directions the beamformer 404 will apply less attenuation of the signals received at the microphone array 206 from the other (unwanted) directions than if only a single principal direction is determined. The output of the beamformer 404 may be used in many different ways in the device 102 as will be apparent to a person skilled in the art. For example, the output of the beamformer 404 could be used as part of a communication event in which the user 104 is participating using the device 102. The output of the beamformer 404 may be provided in the form of a single channel to be processed. It is also possible to output more than one channel, for example to preserve or to virtually generate a stereo image.

The other devices 108 in the communication system 100 may have corresponding elements to those described above in relation to device 102.

Figure 5:
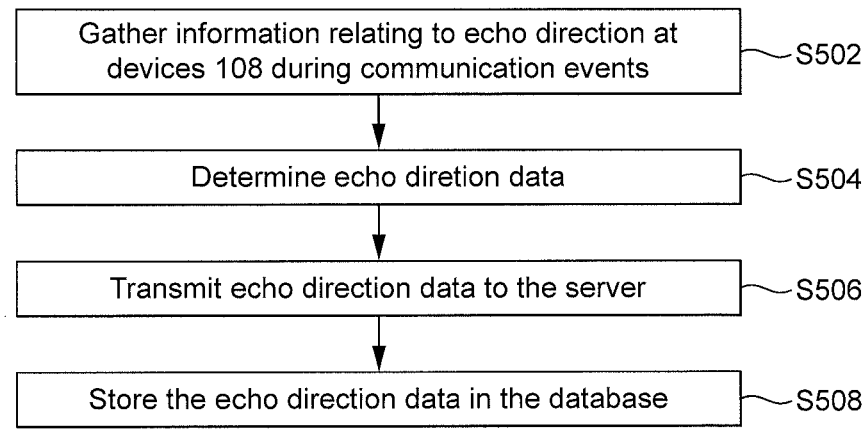
FIG. 5 is a flow chart for a process of processing data according to a preferred embodiment.

With reference to FIG. 5 there is now described a method of processing data according to a preferred embodiment. In step S502, the other devices 108 in the communication system 100 gather information relating to echo direction during communication events in which the devices 108 engage. For example, information may be gathered throughout a call relating to the direction in which echo is arriving at microphone arrays of the devices 108. This may be done by updating a direction of arrival estimate during echo activity, for example, using correlation based methods as described in more detail below in relation to FIG. 7.

In step S504, when a communication event involving a device 108 ends, the device 108 determines echo direction data based on the information which was gathered in step S502. Each of the devices 108 does this independently. The echo direction data includes: (i) data relating to the echo direction from which echoes are received during the communication event at that device 108, and (ii) an identifier of that device 108. The identifier may include the type, model and/or category (e.g. personal computer, mobile phone or television) of the device 108.

In step S506 the echo direction data determined in step S504 is transmitted from the devices 108 to the server 112, e.g. via the network 106. In this way, after a call (or other communication event) involving the device 108 the estimated angle for the echo direction is sent to the server 112 with the identifier, which may be a string which identifies the category, type and model of the device 108.

In step S508 the server 112 stores the echo direction data received from the devices 108 in the database 114. Over time, there will be multiple estimates of the echo direction for different categories, types and models of device which use the communication system 100, and these estimates are stored in the database 114.

Therefore in this way the server 112 is able to store echo direction data for many different categories, types and models of device, which may be used subsequently to provide an indication of a likely echo direction for devices based on the category, type and model of the device.

Figure 6:
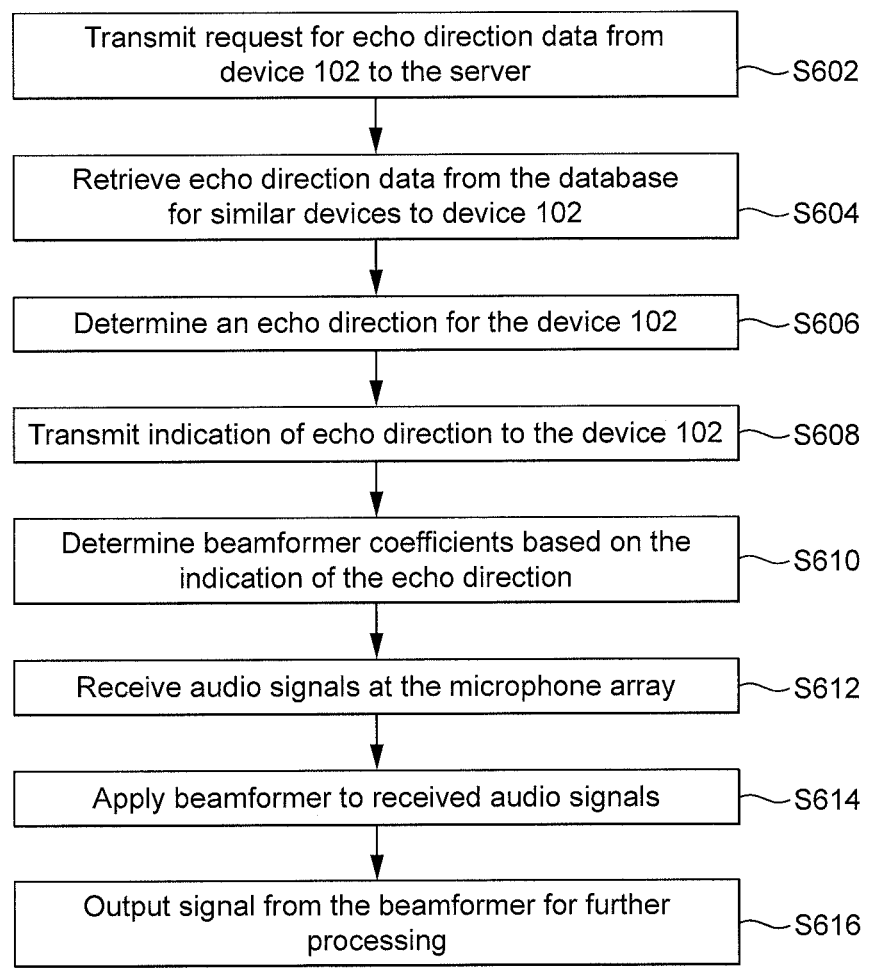
FIG. 6 is a flow chart for a process of processing audio signals according to a preferred embodiment.

With reference to FIG. 6 there is now described a method of processing audio signals according to a preferred embodiment. The device 102 is about to engage in a communication event over the communication system 100, for example with device $108_1$. It is desirable to initialize the beamformer 404 of the device 102 to apply echo suppression to the echo received at the microphone array 206 from the loudspeaker 310. Furthermore, it is desirable to initialize the beamformer 404 in this way before the communication event begins, such that the beampattern is not required to be changed quickly in response to the first instance of far end activity (e.g. speech from user $110_1$) in the communication event.

Therefore, in step S602 before the communication event begins, the device 102 transmits a request to the server 112 for echo direction data. The request includes an identifier of the device 102, such as the type and model of the device 102. The device 102 may be referred to as a "requesting" device. In this way the device 102 queries the database 114 of the server 112 for echo direction data.

In step S604 the server 112 retrieves echo direction data from the database 114 for devices which are similar to device 102. It may be determined that devices are "similar" if they have corresponding identifiers, e.g. identifiers which identify the same type and model of device. For example, the device $108_1$ may be of the same type and model as device 102 (they are shown to be similar in FIG. 1) whereas the device $108_2$ may be of a different type and/or model as device 102 (they are shown to be different in FIG. 1). Therefore, echo direction data supplied to the server 112 from the device $108_1$ may be retrieved in step S604 whereas echo direction data supplied to the server 112 from the device $108_2$ might not be retrieved in step S604.

In step S606 the server 112 determines an echo direction for the device 102 based on the echo direction data retrieved in step S604.

For example, the server 112 may process the echo direction data stored in the database 114 in order to group the echo direction data in the database 114 with respect to the type and model of the devices 108 associated with the respective pieces of echo direction data. The server 112 can then determine, whether for the type and model of the device 102, there is a single echo direction which is much more common than other echo directions, or whether there is no such echo direction. In the case where there is such an echo direction, this may be interpreted by the server 112 as meaning that the microphone array and the loudspeaker of devices of the same type and model as the device 102 are embedded into the device, such that the audio signals output from the loudspeaker of these devices are received at the microphone array with the same direction of arrival. In this case, the echo direction which is the same in most of the devices 108 which are similar to device 102 is determined to be a likely echo direction for the device 102 in step S606.

If there is no common echo direction which is the same in most of the calls made with a similar device to device 102, this is interpreted by the server 112 as meaning that the microphone array and loudspeaker of devices of the same type and model as the device 102 are not embedded into the device, and as such the determination of the echo direction for the device 102 may be less certain. In these cases the server 112 may continue to determine the most common echo direction for devices of the same type and model as device 102, or the server 112 may determine that no echo direction should be determined for use by the device 102.

In step S608 an indication of the echo direction which has been determined in step S606 is transmitted from the server 112 to the device 102, e.g. via the network 106.

In step S610 the device 102 determines the beamformer coefficients for the beamformer 404 based on the indication of the echo direction which was transmitted in step S608. The beamformer coefficients are determined such that the beamformer will apply echo suppression to audio signals received at the microphone array 206 from the indicated echo direction. Step S610 is performed before a communication event begins such that the beamformer 404 is initialized before the communication event begins. Therefore the beamformer 404 is prepared for echo arriving from the indicated echo direction before the communication event commences, and before the first instance of far end activity in the communication event.

In step S612, the communication event has commenced and audio signals are received at the microphones ($402_1$, $402_2$ and $402_3$) of the microphone array 206. The audio signals are received, for example, from the user 104, the TV 304 and the fan 306, and these audio signals constitute the near-end audio signals as shown in FIG. 3 and FIG. 4. The microphones in the microphone array 206 also receive an echo signal from the loudspeaker 310 as shown in FIG. 3 and FIG. 4. Other interfering audio signals, such as background noise, may also be received at the microphones ($402_1$, $402_2$ and $402_3$) of the microphone array 206, and these other interfering audio signals will constitute further near-end audio signals. The audio signals $y_1(t)$, $y_2(t)$ and $y_3(t)$ received by each microphone ($402_1$, $402_2$ and $402_3$) of the microphone array 206 are passed to the beamformer 404. The echo signal is the result of the audio output processing means 308 sending the loudspeaker audio signal $x(t)$ to the loudspeaker 310 and the loudspeaker 310 outputting the loudspeaker audio signal $x(t)$. The loudspeaker audio signal $x(t)$ propagates through an echo path and is present in the received audio signals $y_1(t)$, $y_2(t)$ and $y_3(t)$.

In step S614 the beamformer 404 applies the beamformer filter coefficients determined in step S610 to the received audio signals ($y_1(t)$, $y_2(t)$ and $y_3(t)$) to thereby generate a beamformer output. As described above the beamformer 404 focuses on audio signals received at the microphone array 206 from the principal direction ($d_1$) to thereby enhance the desired audio signals received from the user 104, and to apply suppression to other audio signals received at the microphone array 206 from other directions. The task of the beamformer 404 is to enhance the signals from the principal source relative to other disturbing sources. In particular the beamformer 404 will apply echo suppression to audio signals received at the microphone array 206 from the echo direction which was indicated in the transmission of step S608.

In step S616 the signal is output from the beamformer 404 for further processing in the device 102. For example the signal output from the beamformer 404 may be used in the communication event, for example for transmission to another device (e.g. device $108_1$) over the network 106 as a speech signal from the user 104 to another user (e.g. user $110_1$) as part of an audio or video call.

During the communication event the device 102 may determine an actual echo direction from which the audio signals output from the loudspeaker 310 are received at the microphone array 206. If the actual echo direction is different from the indicated echo direction then the beamformer coefficients can be adapted such that the beamformer 404 applies echo suppression to audio signals received at the microphone array 206 from the actual echo direction.

If the echo direction indicated by the server 112 matches the actual direction from which echoes are received at the microphone array 206 from the loudspeaker 310 then the beamformer coefficients will not need to be adjusted in response to the first instance of the far end activity in the communication event. This advantageously reduces distortion of the beampattern, thereby providing a more natural sounding signal. By initializing the beamformer 404 with an echo direction that is close or equal to the correct echo direction, the changes that are needed to be made to the beampattern of the beamformer to obtain suppression of the echo are significantly reduced as compared with the prior art.

If the echo direction indicated by the server 112 does not match the actual direction from which echoes are received at the microphone array 206 from the loudspeaker 310 then the beamformer coefficients are adapted such that the beampattern of the beamformer 404 is changed slowly until the beamformer 404 is applying suitable echo suppression in the actual echo direction.

The operation of direction of arrival (DOA) estimation performed to determine an echo direction of arrival of an echo (e.g. at the devices 108 and at the device 102) will now be described in more detail with reference to FIG. 7.

The DOA information is estimated by means of estimating the time delay, e.g. using correlation methods, between received audio signals at the plurality of microphones of the microphone array 206, and estimating the source of the audio signal using the a priori knowledge about the location of the plurality of microphones $402_1$, $402_2$ and $402_3$ of the microphone array 206.

Figure 7:
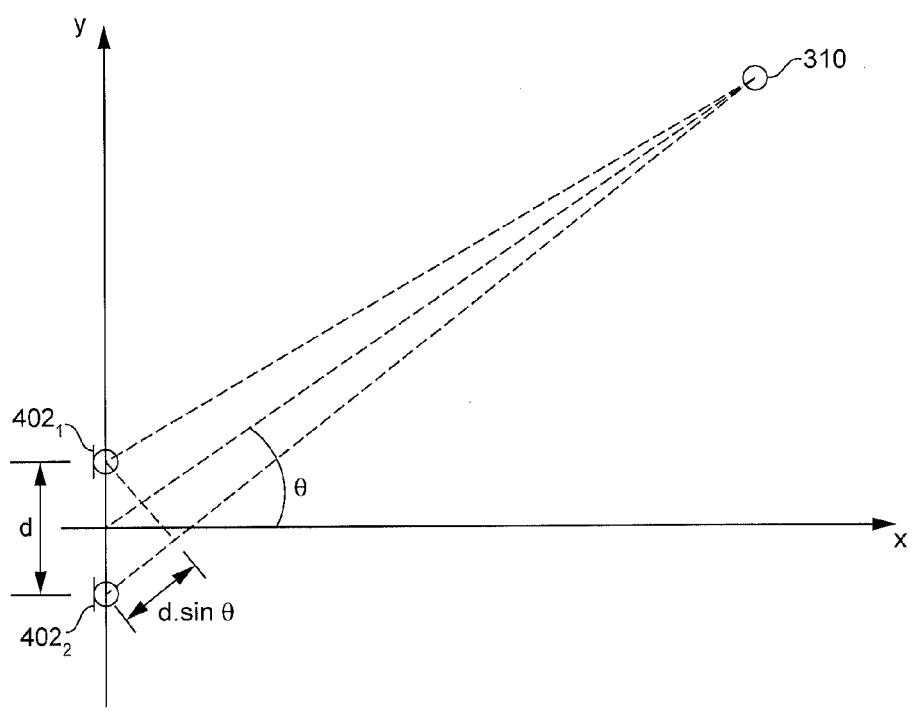
FIG. 7 shows a diagram representing how Direction of Arrival information is estimated in one embodiment.

As an example, FIG. 7 shows microphones $402_1$ and $402_2$ of the microphone array 206 receiving audio signals on two separate input channels from the loudspeaker 310. For ease of understanding FIG. 7 shows the loudspeaker 310 as a point source where waves are propagating in a circular motion away from the source 310. This is how it is in real-life, but the equation shown below assumes that the received audio signals are received at the microphones $402_1$ and $402_2$ as plane waves. This assumption is a good assumption when the point source 310 is 'far enough' away from the microphones $402_1$ and $402_2$. However, it should be noted that the plane wave assumption is merely used to simplify the math, and is not in any way a pre-requisite for the current invention, which works equally well without the plane wave assumption. The direction of arrival of the audio signals at microphones $402_1$ and $402_2$ separated by a distance, d, can be estimated using equation (1):

$$\theta = \arcsin\left(\frac{\tau_D v}{d}\right) \quad (1)$$

where v is the speed of sound, and $T_D$ is the difference between the times that the audio signals from the loudspeaker 310 arrive at the microphones $402_1$ and $402_2$—that is, the time delay. The distance, d, is a known parameter for the microphone array 206 and the speed of sound, v, is known (approximately 340 ms$^{-1}$). The time delay, $T_D$, is obtained as the time lag that maximises the cross-correlation between the received interfering audio signals at the outputs of the microphones $402_1$ and $402_2$. The angle, θ, may then be found which corresponds to this time delay using equation (1) given above. Characteristics of the loudspeaker signal $x(t)$ can be detected in audio signals received with the delay of maximum cross-correlation to determine the echo direction of the loudspeaker 310.

It will be appreciated that calculating a cross-correlation of signals is a common technique in the art of signal processing and will not be describe in more detail herein.

In the method shown above in relation to FIG. 6 the server 112 determines the indication of the echo direction for the device 102 in response to receiving a request from device 102. In other embodiments, the server 112 may determine that an indication of an echo direction is to be determined for the device 102 without receiving a request from the device 102. Therefore the method shown in FIG. 6 may start from step S604 without the need for a request to be received at the server 112, as illustrated in step S602. For example, the server 112 could broadcast the indication of the echo direction to the device 102 (and other echo directions to respective other devices in the communication system 100). The device 102 can store the indicated echo direction for subsequent use at the device 102 for future communication events. The device 102 can use the newly received echo direction indication as described above without having sent a request to the server 112 for the echo direction indication. In this sense it may be the server 112 that initiates the process rather than the device 102.

As described above, the beamformer 404 may be implemented in software executed on the CPU 204 or implemented in hardware in the device 102. When the beamformer 404 is implemented in software, it may be provided by way of a computer program product embodied on a non-transient computer-readable medium which is configured so as when executed on the CPU 204 of the device 102 to perform the function of the beamformer 404 as described above.

Whilst the embodiments described above have referred to a microphone array 206 receiving one desired audio signal ($d_1$) from a single user 104, it will be understood that the microphone array 206 may receive audio signals from a plurality of users, for example in a conference call which may all be treated as desired audio signals. In this scenario multiple sources of wanted audio signals arrive at the microphone array 206.

The device 102 may be a television, laptop, mobile phone or any other suitable device for implementing the invention which has multiple microphones such that beamforming may be implemented. Furthermore, the beamformer 404 may be enabled for any suitable equipment using stereo microphone pickup.

Embodiments of the invention are particularly useful for devices which have loudspeakers and microphones embedded into the housing of the device, such that the echo direction from which loudspeaker signals are received at the microphone array is fixed. For these devices the echo direction determined by the server 112 should be an accurate indication as to the echo direction which the device 102 will experience.

Other embodiments of the invention can be used for devices in which one or both of the loudspeaker and the microphone array are not embedded in the housing of the device. With such devices there may still be particular echo directions which are more likely than other echo directions, so the invention is still useful, although the accuracy of the indication as to the echo direction which the device 102 will experience may be lower than for devices in which the loudspeaker and microphone array are embedded in the housing of the device.

In the embodiments described above, the loudspeaker 310 is a monophonic loudspeaker for outputting monophonic audio signals and the beamformer output from the beamformer 404 is a single signal. However, this is only in order to simplify the presentation and the invention is not limited to be used only for such systems. In other words, some embodiments of the invention may use stereophonic loudspeakers for outputting stereophonic audio signals, and some embodiments of the invention may use beamformers which output multiple signals.

The method described above with reference to FIG. 5 relates to the devices 108 sending echo direction data to the server 112 for storage in the database 114. The device 102 may also determine echo direction data which may be sent to the server 112 for storage in the database 114 in the same way as described above in relation to the devices 108. Similarly, the method described above with reference to FIG. 6 relates to the device 102 receiving and using an indication of a likely echo direction. Any of the devices 108 may also receive and use an indication of a likely echo direction in the same way as described above in relation to the device 102.

In the embodiments described above the device 102 transmits a request, to the server 112, for the likely echo direction at the device 102 in order to initialize the beamformer 440 at the device 102, and the server 112 responds by transmitting the echo direction to the device 102. However, in alternative embodiments, the server 112 may determine the likely echo direction for a particular category, type and model of device as described above, but in these alternative embodiments this determination is performed before a request is received from a particular device. The determined echo direction can be provided to devices of the particular category, type and model and pre-stored in memory at those devices. In this case, when the device 102 is about to start a communication event, the echo direction can be retrieved from the memory at the device and used to initialize the beamformer coefficients such that the beamformer applies echo suppression in the likely echo direction. Therefore in these alternative embodiments the likely echo direction is determined at the server (as in the embodiments described above) and provided to the device, however in these alternative embodiments this may be done offline (i.e. without transmissions over the network 106 between the server 112 and the device 102) and then stored in memory 214 at the device 102, ready to be used when a communication event involving the device 102 begins.

In yet further alternative embodiments, the data which is gathered from the devices 108 in step S502 may be stored at a data store at the device 102 (either in addition to, or instead of, being stored in the database 114 at the server 112). In these embodiments the device 102 has the information (stored in a data store at the device 102) required to determine an initial echo direction for the beamformer 404 as described above. Therefore, instead of transmitting a request for the echo direction to the server 112 and receiving an indication of the echo direction from the server 112 (steps S602 to S608) the device 102 can query the data store at the device 102 in order to obtain the indication of the echo direction for use by the beamformer 404. The rest of the method shown in FIG. 6 (that is, steps S610 to S616) can then proceed as described above in relation to FIG. 6. Therefore in these embodiments; the data is stored at the device 102, such that the device 102 does not need to communicate with the server 112 in order to determine the initial beamformer coefficients.

The data stored in the data store at the device 102 may be sent from the server 112 to the device 102 once the server 112 has received the data from the devices 108. In other words, in the method of FIG. 5, instead of storing the echo direction data in the database 114 in step S508, the echo direction data may be sent from the server 112 to the device 102 for storage in the data store at the device 102. Alternatively, the data may be sent from the devices 108 to the device 102 for storage in the data store at the device 102. Alternatively still, the data may be provided to the device 102 for storage in the data store at the device 102 from a node in the communication system other than the server, for example, the data may be provided to the device 102 with the beamformer 404.

Although in the embodiments described above, it is described that the devices 108 send echo direction data to the server 112 following a communication event, the device 102 may also send echo direction data to the server 112 following a communication event in which the device 102 is involved. Therefore the data in the data store based on which the echo direction is determined for the device 102 may include data provided by the device 102 itself. In one example, the echo direction for the device 102 may be determined based only on data gathered by the device 102 itself during one or more communication events at the device 102. In this way the beamformer coefficients for the beamformer 404 may be based on the echo direction determined at the device 102 in at least one earlier communication event (e.g. audio or video call) at the device 102. The echo direction data gathered by the device 102 during multiple communication events at the device 102 may be sent from the device 102 to the server 112 and the server 112 may average the echo direction data received from the device 102 to determine an average echo direction for the device 102. This average echo direction may be sent from the server 112 to the device 102 such that the device 102 can initialize the beamformer coefficients of the beamformer 404 prior to a subsequent communication event at the device 102.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of processing audio signals at a device for use in a communication event, the device comprising an audio output for outputting audio signals of the communication event, the method comprising:
   the device querying a data store to obtain an indication of an echo direction from which audio signals output from the audio output are likely to be received at a microphone array of the device, said microphone array comprising a plurality of microphones;
   determining beamformer coefficients of an adaptive beamformer of the device in dependence upon the obtained indication of the echo direction;
   receiving audio signals at the plurality of microphones of the microphone array; and
   applying, using the adaptive beamformer, the determined beamformer coefficients to the received audio signals, thereby generating a beamformer output for use in the communication event, wherein the beamformer coefficients are determined such that the adaptive beamformer applies echo suppression to audio signals received at the microphone array from the indicated echo direction.

2. The method of claim 1 further comprising:
   outputting audio signals of the communication event from the audio output;
   determining an actual echo direction from which the outputted audio signals are received at the microphone array; and
   responsive to determining the actual echo direction is different from the indicated echo direction, adapting the beamformer coefficients such that the adaptive beamformer applies echo suppression to audio signals received at the microphone array from the actual echo direction.

3. The method of claim 1 wherein querying the data store further comprises querying the data store with an identifier of the device.

4. The method of claim 3 further comprising, responsive to querying the data store:
   using the identifier of the device to retrieve, from the data store, echo direction data received from at least one other device having an identifier which corresponds to the identifier of the device; and
   using the retrieved echo direction data to determine the echo direction for the device.

5. The method of claim 4 wherein the identifier of the at least one other device corresponds to the identifier of the device if the device is at least one of:
   the same type,
   the same model, or
   the same category, as the at least one other device.

6. The method of claim 4 wherein there are a plurality of said other devices, and wherein the echo direction for the device is determined based on averaged statistics of the echo direction data received from the plurality of other devices.

7. The method of claim 6 further comprising determining that the echo direction data received from the plurality of other devices indicates that a particular echo direction is most common for the plurality of other devices and setting the echo direction for the device to be the particular echo direction.

8. The method of claim 4 further comprising:
   receiving echo direction data from the at least one other device, said echo direction data received from each of the at least one other device comprising:
      data relating to an echo direction from which echoes are received during a communication event at that other device, and
      an identifier of that other device; and storing the received echo direction data in the data store.

9. The method of claim 1 wherein the data store is at the device.

10. The method of claim 1 wherein the data store is at a server, and wherein querying a data store further comprises:
    transmitting a query from the device to the server; and
    receiving, at the device and from the server, said indication of the echo direction.

11. The method of claim 10 wherein the indication of the echo direction is broadcast from the server to the device.

12. The method of claim 1 further comprising:
    determining, at the device, echo direction data relating to an echo direction from which echoes are received during a communication event at the device; and
    storing, in the data store, the determined echo direction data,
    wherein the determined echo direction data stored in the data store is used to determine the indication of the echo direction which is obtained, at least in part, by querying the data store.

13. A device for processing audio signals for use in a communication event, the device comprising:
    an audio output for outputting audio signals of the communication event;
    a microphone array comprising a plurality of microphones for receiving audio signals, the device further configured to query a data store to obtain an indication of an echo direction from which audio signals output from the audio output are likely to be received at the microphone array; and
    an adaptive beamformer for applying beamformer coefficients to the audio signals received at the plurality of microphones, thereby generating a beamformer output for use in the communication event; the device further configured to determine said beamformer coefficients in dependence upon the obtained indication of the echo direction, including beamformer coefficients configured to apply echo suppression to audio signals received at the microphone array from the indicated echo direction.

14. The device of claim 13 further configured to:
    determine an actual echo direction from which outputted audio signals outputted from the audio output are received at the microphone array; and adapt the beamformer coefficients, if the actual echo direction is different from the indicated echo direction, such that the adaptive beamformer applies echo suppression to audio signals received at the microphone array from the actual echo direction.

15. The device of claim 13 further configured to query the data store with an identifier of the device.

16. The device of claim 13 further comprising said data store.

17. The device of claim 13 wherein the data store is at a server, and wherein to query the data store, the device is further configured to:
   transmit a query to the server; and
   receive, from the server, said indication of the echo direction.

18. A computer program product for processing audio signals at a device for use in a communication event, the device comprising an audio output for outputting audio signals of the communication event, the computer program product being embodied on one or more computer-readable storage memory hardware devices and configured, responsive to execution by at least one processor of the device, to perform the operations of:
   querying a data store to obtain an indication of an echo direction from which audio signals output from the audio output are likely to be received at a microphone array of the device, said microphone array comprising a plurality of microphones;
   determining beamformer coefficients of an adaptive beamformer of the device in dependence upon the obtained indication of the echo direction; and
   implementing the adaptive beamformer to apply the determined beamformer coefficients to audio signals received at the plurality of microphones of the microphone array, thereby generating a beamformer output for use in the communication event, wherein the beamformer coefficients are determined such that the adaptive beamformer applies echo suppression to audio signals received at the microphone array from the indicated echo direction.

19. A system for processing audio signals for use in a communication event, the system comprising:
   a device comprising:
      an audio output for outputting audio signals of the communication event;
      a microphone array comprising a plurality of microphones for receiving audio signals, the device further configured to query a data store to obtain an indication of an echo direction from which audio signals output from the audio output are likely to be received at the microphone array; and
      an adaptive beamformer for applying beamformer coefficients to the received audio signals, thereby generating a beamformer output for use in the communication event, the device further configured to determine said beamformer coefficients in dependence upon the obtained indication of the echo direction, including beamformer coefficients configured to apply echo suppression to audio signals received at the microphone array from the indicated echo direction; and
   a server comprising the data store and configured to:
      determining determine the echo direction; and
      provide the indication of the echo direction to the device in response to a query from the device.

20. A method of processing audio signals in a communication system, the method comprising:
   determining echo direction data at a plurality of devices of the communication system, said echo direction data determined at each one of the plurality of devices comprising:
      data relating to an echo direction from which echoes are received during a communication event at that one of the plurality of devices, and
      an identifier of that one of the plurality of devices;
   transmitting the determined echo direction data from the plurality of devices to a data store of the communication system;
   storing the echo direction data received from the plurality of devices at the data store;
   querying the data store with an identifier of a particular device of the communication system;
   using the identifier of the particular device to retrieve, from the data store, echo direction data received from at least one of said plurality of devices having an identifier which corresponds to the identifier of the particular device;
   using the retrieved echo direction data to determine an echo direction for the particular device;
   determining beamformer coefficients of an adaptive beamformer of the particular device in dependence upon the indication of the echo direction;
   receiving audio signals at a plurality of microphones of a microphone array of the particular device; and
   applying, using the adaptive beamformer, the determined beamformer coefficients to the received audio signals, thereby generating a beamformer output for use in a communication event, wherein the beamformer coefficients are determined such that echo suppression is applied to audio signals received at the microphone array from the indicated echo direction.

21. A communication system for processing audio signals, the communication system comprising:
   a plurality of devices configured to:
      determine echo direction data, said echo direction data determined at each one of the plurality of devices comprising:
         data relating to an echo direction from which echoes are received during a communication event at that one of the plurality of devices, and
         an identifier of that one of the plurality of devices; and
      transmit the determined echo direction data from the plurality of devices to a server;
   a server configured to:
      receive the transmitted echo direction data from the plurality of devices;
      store the received echo direction data in a data store associated with the server;
      use an identifier of a respective device of the communication system to retrieve, from the data store, echo direction data received from at least one of said plurality of devices having an identifier which corresponds to the identifier of the respective device;
      use the retrieved echo direction data to determine an echo direction for the respective device; and
      provide an indication of the determined echo direction to the respective device; and
   a particular device comprising:
      an audio output for outputting audio signals of a communication event;
      a microphone array comprising a plurality of microphones for receiving audio signals, the particular device configured to query the data store to obtain the indication of the determined echo direction, provided by the server, associated with the received audio signals; and an adaptive beamformer for applying beamformer coefficients to the received audio signals, thereby generating a beamformer output for use in the communication event, the particular device further configured to determine said beamformer coefficients in dependence upon the obtained indication of the determined echo direction, including beamformer coefficients associated with applying echo suppression to audio signals received at the microphone array from the indicated echo direction.

22. A method of processing data at a server of a communication system, the method comprising:

receiving, at the server, echo direction data from a plurality of devices of the communication system, said echo direction data received from each respective device of the plurality of devices comprising:

data relating to an echo direction from which echoes are received during a communication event at the respective device of the plurality of devices, and an identifier of the respective device of the plurality of devices;

storing the received echo direction data in a data store;

determining an identifier of a particular device of the communication system;

using the identifier of the particular device to retrieve, at the server and from the data store, echo direction data received from at least one device of said plurality of devices having an identifier which corresponds to the identifier of the particular device;

using the retrieved echo direction data to determine, at the server, an echo direction for the particular device; and providing an indication of the determined echo direction to the particular device.

23. The method of claim 22 wherein determining an identifier of the particular device further comprises receiving, at the server from the device, a query for echo direction data, said query including the identifier of the particular device.

24. The method of claim 22 wherein providing an indication of the determined echo direction further comprises transmitting the indication of the determined echo direction from the server to the particular device.

25. The method of claim 24 wherein transmitting an indication of the determined echo direction from the server to the particular device further comprises broadcasting the indication of the determined echo direction.

26. The method of claim 22 wherein the identifier of the at least one of said plurality of devices corresponds to the identifier of the particular device if the particular device is at least one of:

the same type, the same mod; and the same category, as the at least one of said plurality of devices.

27. The method of claim 22 wherein there are a plurality of said devices having an identifier which corresponds to the identifier of the particular device, and wherein the echo direction for the particular device is determined based on averaged statistics of the echo direction data received from the plurality of said devices having an identifier which corresponds to the identifier of the particular device.

28. The method of claim 22 further comprising:

determining that the retrieved echo direction data indicates that a particular echo direction is the most common for the plurality of said devices having an identifier which corresponds to the identifier of the particular device; and setting the echo direction for the particular device to be the particular echo direction.

29. A server for processing data, the server being part of a communication system, the server comprising:

at least one processor; and one or more computer-readable storage memory devices embodying processor executable instructions which, responsive to execution by the at least one processor, are configured to enable the server to:

receive echo direction data from a plurality of devices of the communication system, said echo direction data for each the respective device of the plurality of devices comprising:

data relating to an echo direction from which echoes are received during a communication event at the respective device of the plurality of devices, and an identifier of the respective device of the plurality of devices;

store the received echo direction data in an associated data store;

determine an identifier of a particular device of the communication system;

use the identifier of the particular device to retrieve, from the data store, echo direction data received from at least one device of said plurality of devices having an identifier which corresponds to the identifier of the particular device;

use the retrieved echo direction data to determine an echo direction for the particular device; and provide an indication of the determined echo direction to the particular device.

30. A computer program product for processing data at a server of a communication system, the computer program product being embodied on one or more computer-readable memory hardware devices and configured, responsive to execution by at least one processor of the server, to perform the operations of:

receiving echo direction data from a plurality of devices of the communication system, said echo direction data received from each respective device of the plurality of devices comprising:

data relating to an echo direction from which echoes are received during a communication event at the respective device of the plurality of devices, and an identifier of the respective device of the plurality of devices;

storing the received echo direction data in a data store;

determining an identifier of a particular device of the communication system;

using the identifier of the particular device to retrieve, from the data store, echo direction data received from at least one of said plurality of devices having an identifier which corresponds to the identifier of the particular device;

using the retrieved echo direction data to determine an echo direction for the particular device; and providing an indication of the determined echo direction to the particular device.

31. A method of processing data in a communication system, the method comprising:

determining echo direction data at a plurality of devices of the communication system, said echo direction data determined at each respective device of the plurality of devices comprising:

data relating to an echo direction from which echoes are received during a communication event at the respective device of the plurality of devices, and an identifier of the respective device of the plurality of devices;

transmitting the determined echo direction data from the plurality of devices to a server of the communication system;

storing the echo direction data received at the server from the plurality of devices in a data store;

determining an identifier of a particular device of the communication system;

using the identifier of the particular device to retrieve, at the server from the data store, echo direction data received from at least one of said plurality of devices having an identifier which corresponds to the identifier of the particular device;

using the retrieved echo direction data to determine, at the server, an echo direction for the particular device; and providing an indication of the determined echo direction for the particular device to the particular device.

32. The method of claim 31 wherein determining echo direction data at a plurality of devices further comprises, for each respective device of the plurality of devices, gathering information relating to the echo direction from which echoes are received throughout the communication event at the respective device of the plurality of devices.

33. The method of claim 32 wherein said gathering information includes updating a direction of arrival estimate during echo activity of the communication event at the respective device of the plurality of devices.

34. The method of claim 33 further comprising, for each one of the plurality of devices, using the direction of arrival estimate at the end of the communication event at that one of the plurality of devices to determine the echo direction data that is transmitted to the server.

35. A communication system for processing data, the communication system comprising:
a plurality of devices implemented, at least in part, in hardware and configured to:
determine echo direction data, said echo direction data determined at each respective device of the plurality of devices comprising:
data relating to an echo direction from which echoes are received during a communication event at the respective device of the plurality of devices, and
an identifier of the respective device of the plurality of devices; and
transmit the determined echo direction data from the plurality of devices to a server; and
a server implemented, at least in part in hardware, and configured to:
receive the transmitted echo direction data from the plurality of devices;
store the received echo direction data at a data store;
determine an identifier of a particular device of the communication system;
use the identifier of the particular device to retrieve, from the data store, echo direction data received from at least one of said plurality of devices having an identifier which corresponds to the identifier of the particular device;
use the retrieved echo direction data to determine an echo direction for the particular device; and
provide an indication of the determined echo direction to the particular device.

36. A device configured to process audio signals for use in a communication event, the device comprising:
an audio output block configured to output audio signals of the communication event;
a microphone array comprising a plurality of microphones configured to receive audio signals;
a querying block configured to query a data store to obtain an indication of an echo direction from which audio signals output from the audio output block are likely to be received at the microphone array;
an adaptive beamformer configured to apply beamformer coefficients to the audio signals received at the plurality of microphones, thereby generating a beamformer output for use in the communication event; and
a determining block configured to determine said beamformer coefficients in dependence upon the obtained indication of the echo direction, wherein the determining block is configured to determine the beamformer coefficients such that the adaptive beamformer applies echo suppression to audio signals received at the microphone array from the indicated echo direction.

* * * * *